April 28, 1931.  C. RASMUSSEN  1,802,574

NIPPLE HOLDING CHUCK

Original Filed Dec. 16, 1926

INVENTOR.
Charles Rasmussen
BY
Bottum, Hudnall, Lecher, McNenneand Michael
ATTORNEY.

Patented Apr. 28, 1931

1,802,574

UNITED STATES PATENT OFFICE

CHARLES RASMUSSEN, OF RACINE, WISCONSIN, ASSIGNOR OF ONE-HALF TO RALPH T. INGALLS, OF RACINE, WISCONSIN

NIPPLE-HOLDING CHUCK

Original application filed December 16, 1926, Serial No. 155,117. Divided and this application filed June 13, 1928. Serial No. 284,917.

This invention relates generally to pipe threading machines and more particularly to a nipple holding chuck or attachment especially designed and adapted for use with pipe threading machines. The present application is a division of the application of Charles Rasmussen filed December 16, 1926, Serial No. 155,117 for pipe threading machines.

One object of the invention is to provide, in a machine of this character, an improved chuck and attachment therefor for holding the threaded end of a small pipe section, whereby the unthreaded end thereof may be threaded to produce a nipple without damaging the previously threaded end of the section clamped in the chuck.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figures 1, 2, 3, 4:
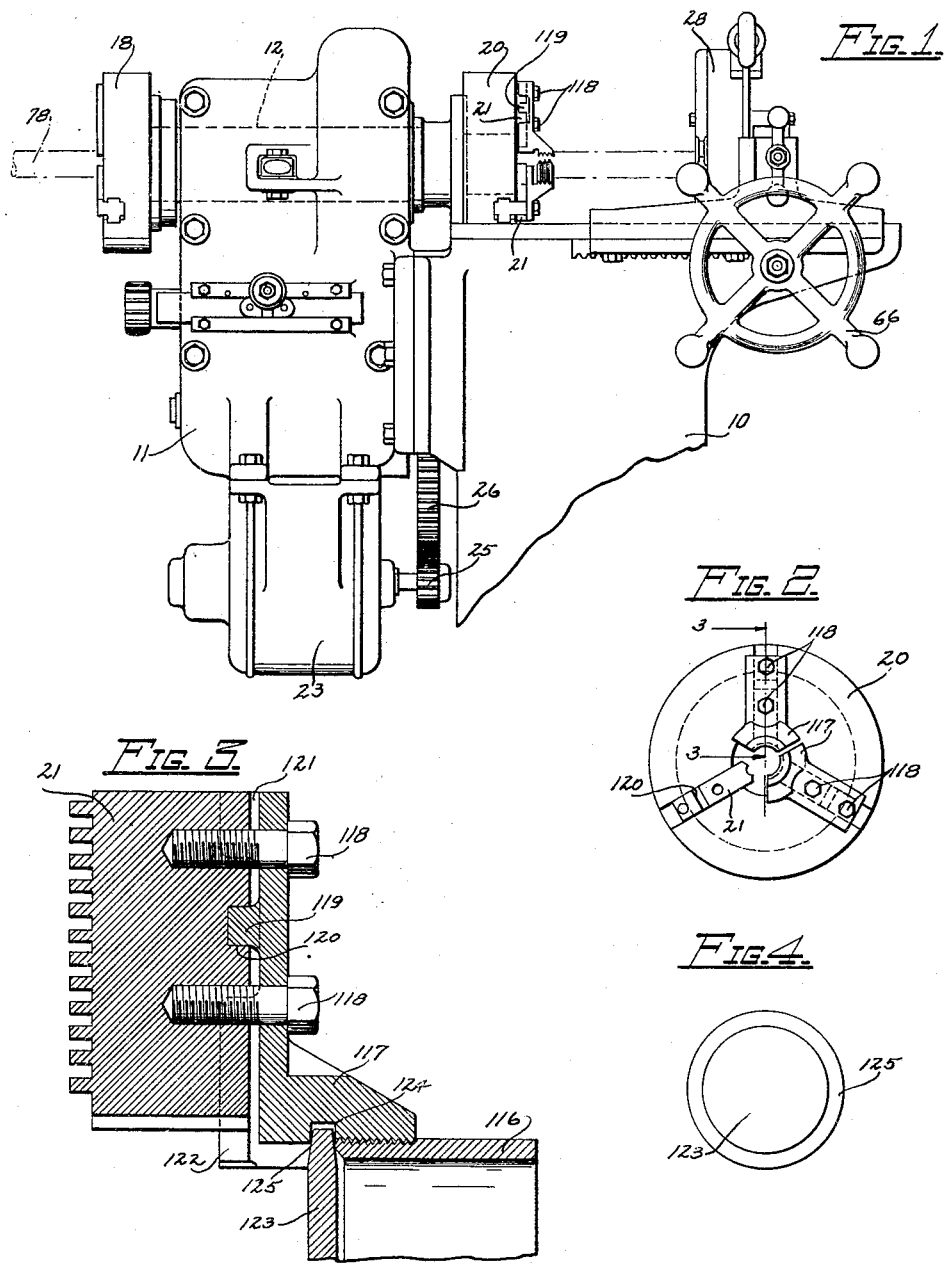
Figure 1 is a fragmentary view in side elevation showing one type of a pipe threading machine with a chuck or attachment embodying the present invention in use thereon.
Figure 2 is a detail view in front elevation of the chuck shown in Figure 1 one of the jaws of the nipple chuck and the machine parts being omitted for the sake of clearness and simplicity in illustration.
Figure 3 is an enlarged sectional view taken on line 3—3 of Figure 2.
Figure 4 is a detail plan view of one of the parts of the nipple holding attachment.

The pipe threading machine with which the nipple holding chuck embodying the present invention is utilized is shown generally in Figure 1, and as illustrated, has the usual base of which a portion is shown at 10. On the base 10, the gear casing 11 is supported and carries the spindle 12 provided at its ends with chucks 18 and 20 of the well known three-jaw universal lathe type. The spindle 12 and the chucks 18 and 29 thereon are rotated from an electric motor 23 by means of a gearing 25—26 and the usual transmission unit (not shown). A die head designated generally at 28 is provided and carries the chasers or pipe threading means, the die head being slidably mounted on the base and fed therealong under the control of the hand wheel feed 66. The details of the mechanism thus far described, of themselves, form no part of the present invention and hence they have not been described or shown with particularity in this application, but reference is made to the pending application above referred to and of which this case is a division for a full disclosure of these parts.

It is to be understood, however, that as shown in Figure 1, the pipe 78 to be threaded is passed through the chucks 18 and 20 and held thereby for rotation therewith and the hand wheel 66 is thus turned to carry the die head forward to the left until the die chasers cut into the pipe to make the threads, after which the die head is carried further forward by reason of the threaded engagement of the die chasers with the pipe. This operation occurs, of course, only when a pipe of considerable length is being threaded and at such time the nipple holding chuck is detached from the standard chuck 20.

When it is desired to make a nipple, or a relatively short pipe section threaded at each end, the stock is threaded at one end and a short section 116 cut off, as shown in Figure 3. Jaws 117 having their clamping faces threaded to fit the threaded end of the pipe section or nipple, as shown, are attached to each of the jaws 21 of chuck 20 by bolts 118, jaws 117 being provided with the lugs 119 which fit into recesses 120 in the chuck jaws 21 whereby the jaws 117 are properly centered with respect to the axis of rotation of the chuck. The jaws 117 may be provided with spaced lugs 121 and 122 which fit over the adjacent edges of the jaws 21 and provide additional means for holding jaws 117 in fixed relation with respect to jaws 21. The threaded end of the pipe section 116 and a wedging element in the form of a disk-shaped slug 123 are placed between the jaws 117 and the chuck operated to impart clamping movement to the latter. As shown in Figure 3, the jaws 117 are provided in their faces with recesses 124 which receive the tapered edge 125 of a slug 123 upon clamping movement of jaws 117 whereby the slug co-acts with the latter and the adjacent threaded end of pipe section 116 with a wedging action to urge the latter axially with respect to jaws 117. By reason of this construction and manner of operation, the threaded end of the pipe section or nipple 116 is tightly clamped between jaws 117 and held against any rotary movement, and the threads on the threaded end of the pipe section protected during the threading operation of the die chasers on the unthreaded end of the pipe section. From the foregoing it will be seen that means in the form of an attachment has been provided whereby the machine may be readily adapted to make nipples, and that this attachment may be quickly secured to one of the chucks 20 and clamps the threaded end of the nipple securely without damaging the threads during the threading operation on the other end of the nipple.

Of course, when a nipple is being threaded, there is no pipe 78 in the machine and the die head must be advanced well up to the nipple holding chuck to bring its chasers into engagement with the unthreaded section of the nipple stock. By virtue of the co-action of the threaded jaws for the nipple holding chuck and of the disk-like slug, the nipple is rigidly and securely gripped and is thus held against all movement except the rotary movement imparted thereto by the chuck and yet when the jaws are retracted, the nipple is readily released from its chuck.

I claim:

1. In a pipe-threading machine, a chuck having pipe-holding jaws provided with threads adapted to fit a threaded pipe end, and wedging means engageable with said pipe end under the actuating influence of said jaws upon clamping engagement of the latter with said pipe end to urge the same axially with respect to said jaws.

2. In a pipe-threading machine, a chuck having pipe-holding jaws provided with threads adapted to fit a threaded pipe end, a disk-shaped slug engageable at its edge with said pipe end and actuated by said jaws upon clamping engagement of the latter with said pipe end to urge the same axially with respect to said jaws.

3. In a pipe threading machine, a chuck having jaws adapted to hold the threaded end of a pipe section, said jaws being provided with recesses and a wedge adapted to engage the walls of said recesses upon movement of the jaws toward each other to hold the pipe section, said wedge being also adapted to engage the end of said pipe section and urge the same axially as the jaws move together.

In witness whereof, I hereto affix my signature.

CHARLES RASMUSSEN.